United States Patent [19]

Monroe et al.

[11] Patent Number: 4,829,583
[45] Date of Patent: May 9, 1989

[54] METHOD AND APPARATUS FOR PROCESSING IDEOGRAPHIC CHARACTERS

[75] Inventors: James C. Monroe; Stephen E. Roberts; Thomas A. Knoche, all of San Diego, Calif.

[73] Assignee: Sino Business Machines, Inc., San Diego, Calif.

[21] Appl. No.: 77,600

[22] Filed: Jul. 23, 1987

Related U.S. Application Data

[63] Continuation-in-part of Ser. No. 91, Jan. 2, 1987, abandoned, which is a continuation of Ser. No. 740,411, Jun. 3, 1985, abandoned.

[51] Int. Cl.$^4$ ............................................. G06K 9/00
[52] U.S. Cl. ........................................ 382/13; 382/11; 382/56; 400/110
[58] Field of Search ............... 382/1, 56, 13, 11, 36, 382/24, 37; 400/110; 340/365 R

[56] References Cited

U.S. PATENT DOCUMENTS

| | | | |
|---|---|---|---|
| 3,665,450 | 5/1972 | Leban | 340/324 A |
| 3,820,644 | 6/1974 | Yeh | 197/1 A |
| 3,852,720 | 12/1974 | Park | 340/172.5 |
| 4,096,934 | 6/1978 | Kirmser et al. | 400/110 |
| 4,144,405 | 3/1979 | Wakamatsu | 178/30 |
| 4,173,753 | 11/1979 | Chou | 340/146.3 R |
| 4,193,119 | 3/1980 | Arase et al. | 364/900 |
| 4,228,507 | 10/1980 | Leban | 364/419 |
| 4,251,871 | 2/1981 | Yu | 364/518 |
| 4,270,022 | 5/1981 | Loh | 178/30 |
| 4,327,421 | 4/1982 | Wang | 364/900 |
| 4,365,235 | 12/1982 | Greanias et al. | 382/24 |
| 4,379,288 | 4/1983 | Leung et al. | 340/365 |
| 4,462,703 | 7/1984 | Lee | 400/110 |
| 4,500,872 | 2/1985 | Huang | 340/365 R |
| 4,516,262 | 5/1985 | Sakurai | 382/36 |
| 4,561,105 | 12/1985 | Crane et al. | 382/13 |
| 4,573,196 | 2/1986 | Crane et al. | 382/37 |
| 4,607,386 | 8/1986 | Morita et al. | 382/13 |
| 4,672,677 | 6/1987 | Yamahawa | 382/13 |
| 4,682,365 | 7/1987 | Orita et al. | 382/37 |
| 4,684,926 | 8/1987 | Yong-Min | 382/56 |
| 4,685,142 | 8/1987 | Ooi et al. | 382/13 |

FOREIGN PATENT DOCUMENTS 0087871 2/1983 European Pat. Off. .
0114248 11/1983 European Pat. Off. .

OTHER PUBLICATIONS

Sethi et al., "Machine Recognition of Constrained Hand Printed Devanagari", *Pattern Recognition,* vol. 9, 1977, pp. 69–75.

"Real Time Chinese Hand Writing Recognition Machine", Massachusetts Institute of Technology, Sep., 1966, Jung Hsi Liu.

"An Interactive System for Chinese Character Generation and Retrieval," IEEE Transactions on Systems, Man, and Cybernetics, vol. SM-3, No. 3, 5/73.

"Keyboard Method for Composing Chinese Characters," IBM Journal of Research and Development, vol. 19, No. 1, 1/75.

*Primary Examiner*—Leo H. Boudreau
*Assistant Examiner*—Joseph Mancuso

[57] ABSTRACT

A method and apparatus for generating an ideographic character in response to an operator input. The apparatus includes an input device which generates a series of input signals in responses to an input sequence of writing strokes corresponding to identifiable constituent characteristics of an ideographic character contained in a set of idiographic characters. A processor stores a library of character representations, each character representation in the library of character representations represents a respective character of the set of ideographic characters and each character representation being identified according to predetermined constituent characteristics of the represented ideographic character. The processor is responsive to the input signals for selecting a character representation from the library of character representations. The processor upon selection of a character representation provides the selected character representation as an output signal.

47 Claims, 8 Drawing Sheets

| | CHARACTER STROKE START AND END POSITIONS | |
|---|---|---|
| | START POSITION | END POSITION |
| CHARACTER STROKE — FIRST STROKE | 20 | 39 |
| CHARACTER STROKE — LAST STROKE | 71 | 8 |

METHOD AND APPARATUS FOR PROCESSING IDEOGRAPHIC CHARACTERS

BACKGROUND OF THE INVENTION

I. Field of the Invention

This is a continuation-in-part of application Ser. No. 000,091 filed Jan. 2, 1987 which is a continuation of application Ser. No. 740,411 filed June 3, 1985, both now abandoned.

The present invention relates to a method and apparatus for information processing. In particular, the present invention relates to a novel and improved method and apparatus for use in coding ideographic characters and for recognition of an input corresponding to each character for output of the character for display or printing.

II. Background Art

The Chinese language is one of several languages based upon the use of ideographic characters. These languages are typically non-linear and include no alphabet since each character defines a unique word. Since each character defines a unique word, there is a vast number of characters required to form a dictionary of characters. In addition, two or more characters are combined to form a third unique Chinese word. As one example, in the Chinese language there are in excess of 35,000 characters. However, there are approximately 8,000 listed in a commonly used Chinese-English dictionary which are sufficient for modern Chinese language usage.

In the Chinese written language, each character is defined by a number of writing strokes, which typically number from 1 to 26. A writing stroke is typically defined as a mark or line readily made without lifting a writing instrument from the writing surface. Furthermore, in the Chinese written language there are also approximately 40 individual stroke shapes. The size variation of these 40 stroke shapes therefore expands the number of stroke types to approximately 82.

There have been several previous attempts at coding the Chinese language for printing, by means such as a typewriter or a computer based word processor. In attempting to provide an input and output of data from these systems, various methods have been employed. These methods have sought to "simplify" the seemingly insurmountable mountain of character parameters into a manageable and "regularized" amount of information.

Historic examples of efforts in simplification are found in the Chinese "simplified characters." In this system, a commonly used character may be reduced from 20 strokes to 16 or 18 strokes.

Another simplification system is exemplified by the Chinese telegraphy system devised almost a century ago. In the telegraphy system 9,999 characters were selected from the entire Chinese language with each assigned an identification number. In this latter system, the operator is required to memorize the numeralization of the character library. One disadvantage of this system is that a whole new set of information is developed. Hence, this system requires the working knowledge for the operator. A further disadvantage of this system is that, in an overall perspective, it is an abstract system. In analyzing the abstract nature of the system, there is no connection between the identifying number and any perceptible feature of the intended character itself which might make recognition and classification of the characters easier. Furthermore, limiting the number of characters presents deficiencies in the system restricting the nuances, vigor, meaning differences, force, and color of the language in communication. Without these characteristics, the language is reduced to a sophomoric blandness unacceptable for wide spectrum communication.

More modern systems have attempted to simply computerize the traditional Chinese dictionary search by "radical" identification. Radicals have been simplified, or reduced in number, in an effort to enhance operator throughput. Although "radicals" are an inherent part of the Chinese written language all attempts to define Chinese characters by combinations of radicals and other strokes have failed. This type of search for the intended character inevitably involves selection from a menu of character features. The activity leading to the exact character is tedious, distracting, and time consuming. As a result, the operator output rarely exceeds twenty (20) to thirty (30) characters per minute which translates, at best, to the range of ten (10) to fifteen (15) words per minute.

Simplification has also been attempted at the stroke level. Attempts have been made at reducing the number of "basic" strokes to fourteen (14) or fewer. This in effect, is more of an adaptation of the language to the machine than the machine to the language. This type of "simplification" usually calls upon the operator to also learn a Roman language; relearn Chinese according to revised rules of the language; or memorize and utilize an accompanying code requiring perception and choice selection on the operator's part.

There have also been several attempts to phoneticize the Chinese language for word processing use. Generally these attempts have failed because of two insurmountable obstacles. One obstacle is caused by the veritable legion of multiple homonyms in the Chinese language. The other obstacle is caused by the different pronunciations by different groups in China. For example, the Cantonese, who read and write Chinese in the official Mandarin pronounce it quite differently than other Chinese groups.

It is therefore desirable to have an ideographic character processing apparatus and method which encodes and decodes ideographic characters at through-put rates comparable to those achieved with Roman word processors and computers. It is desirable that such through-put of the ideographic characters be achieved without eliminating or altering any characters from the full character spectrum; restricting the capabilities of the language; impoverishing the scope of the language system itself; or learning a foreign language, abstract code or complicated procedures.

It is well known that the Chinese written language has been taught both historically and in modern times in a very structured, formalized and specific manner approaching ritualistic. The Chinese use a training square for purposes of learning to write their language. The training square is divided into nine subsquares with each subsquare being further divided into nine sub-subsquares. Using the Chinese training square as a basic positional and proportional guide, characters are taught by stroke, i.e. stroke size, stroke shape, stroke location, stroke order and stroke number. The result is that all literate Chinese intuitively know, and with great specificity, the exact manner and sequence in which each character is properly formed. Each character has a precise number of strokes written in a specific, conventional and standard order with each in a unique positional relationship to all other strokes in the character.

The sequence of stroke input for each character is as rigid as the letter input sequence in linear languages. In English writing, for example, the word "information" is input from left to right in the same order in which the letters finally repose. While it is possible to write "in----tion," then "for," etc., until the entire letter assemblage is complete, the economy of writing, visual direction, and physical response all strongly prefer the sequential methods universally used. So with Chinese, the sequence of constituent strokes of a character is fixed, so much so that it is said that if the stroke, and position, are written in a different order the character appears to be that written by a child or person not fully learned in the Chinese language. As in linear languages, slight variations in stroke structure which are the natural results of the idiosyncracies of human handwriting are not disidentifying, however.

Thus, the literate Chinese knows the number of strokes that form a character, the precise and standard sequence in which each stroke is written, and the exact position, to a one in eighty-one (1:81) precision. The literate Chinese also know where each stroke must begin and end; its identity or kind, by shape and size.

The present invention recognizes that the same process by which a complex Chinese character is quickly perceived and deciphered in reading Chinese, can be utilized to achieve a language processor of extraordinary efficiency. There is therefore an underlying visual organization principle in all Chinese characters. This principle, called the shorthand visual pattern recognition discriminators, enables the eye to instantly recognize each known character by means of a gestalt right hemisphere brain function without the need to visually trace each stroke. These shorthand visual pattern recognition discriminators are in a most remarkably way superbly fashioned to fully utilize the natural physiology and vision dynamics of the human eye.

The complex eye movements fundamental to vision are well known and clearly described in texts, such as the *Encyclopedia Britannica, Volume 7, Eye and Vision, Human* and more specifically at pages 99–100 (MacroPaedia). It is the singular and extraordinary achievement of the Chinese written language that the visual organization of its characters utilizes the eye's natural physiology and vision dynamics to function at an efficiency far surpassing that attained by the linear Roman language systems. The universal system of Chinese writing instruction follows and reinforces this remarkable visual encoding and deciphering system. The shorthand visual pattern recognition discriminators therefore permit instantaneous recognition of each known character, no matter the complexity.

It is easy to see how the eye could recognize simple characters such as 中 without tracing the strokes or engaging in highly involved imagery delineation. However, with an 11 stroke character such as 馬 or a 24 stroke character such as 鹽 the eye is presented with an apparent maze which appears to be understandable only by involved visual delineation and tedious eye movements. In practice, however, complex characters are as readily recognized as the simplest of characters. Furthermore, once learned, recognition of the complex characters requires no more time, eye movement, or visual effort than the simple characters.

The Chinese written language is taught, and has been from time immemorial, by means of writing strokes characterized by the type, order, position and size within the Chinese training square. Utilizing certain of these stroke parameters, the Chinese written language can be made amenable to direct computer use and word processing. Using the stroke identified features of a character, the character itself may itself be identified. Thus, the natural visual encoding and deciphering process of the eye may be readily transposed to the computer.

It is therefore an object of the invention to provide a novel and improved method and apparatus for the processing of ideographic characters.

SUMMARY OF THE INVENTION

In accordance with the present invention, a method and apparatus for the processing of ideographic characters is taught. The individual characters of the language are compiled into a data base and indexed according to the stroke identified features, such as stroke kind and position. An operator then may input selected stroke identifying features of a selected character into the computer. The computer searches for characters stored within the data base that have the same stroke identified features as input by the operator. The computer then outputs the character that has stroke identified features matching the selected, inputted character for visual display, printing, auditory expression, translation or data storage.

A basis of this system is the indexing of each character in the data base according to the stroke identified features. One system for identifying characters based on stroke information is the use of the position of the strokes within the Chinese training square. For example, the position of the first stroke of the character is of great use as a stroke identified feature. Using the starting point of the initial character stroke of each character within the Chinese training square permits an indexing of characters having a similar starting point so as to organize the 8,000 commonly used individual words into a smaller number of character groups. Since there are only 81 possible starting positions for the individual character the use of the starting point as a character identification feature reduces the library of a possible target characters. The specific identification process utilizes several additional select, representative stroke positions as identifying features of the selected character. These stroke positions are used to identify the selected character in the library of characters stored in the computer data base.

The apparatus disclosed in the present invention is for generating an ideographic character in response to an operator input. An input means generates a series of input signals in response to an operator input of a sequence of position-oriented writing strokes. These writing strokes form an integral constituent of an ideographic character contained in a set of ideographic characters. A processor means is responsive to the input signals corresponding to the position of at least two select constituent writing strokes of a character for selecting a bit map, representative of and corresponding to the selected ideographic character, from a library of bit maps. Each bit map in the library of bit maps represents a different ideographic character of the set of ideographic characters and is identified by at least two select, representative strokes of the writing strokes of the represented ideographic character. The processor means provides the selected bit map as an output signal representative of the selected ideographic character.

Display means may be included for receiving the output signal and providing a visual display of the selected ideographic character. The select representative input writing strokes are typically predetermined to be the first and last writing strokes in the standard order of writing a Chinese ideographic character. Additionally, the select representative writing strokes can represent other constituent writing strokes of the ideographic character. The invention thus operates utilizing the corresponding input signals of the identifying combinations of the starting and ending position of the first and last strokes of the standard order of writing an ideographic character, of the kind-position of the first and second strokes, of the second and penultimate strokes, of the penultimate and last strokes, and of all other identifying combinations of constituent strokes of an ideographic character.

The present invention further comprises a method of generating an ideographic character selected from a set of ideographic characters. The method includes the providing of position-oriented writing strokes that form a constituent aspect of an ideographic character selected from a set of ideographic characters. The position of at least two select representative writing strokes of the selected ideographic characters are detected so that a plurality of input signals are generated. These input signals correspond to the position of the starting and ending point of at least two select representative writing strokes of the selected ideographic character. A library of bit maps is provided with each bit map in the library of said bit maps representative of a different unique ideographic character in the set of ideographic characters and identified by the position of at least two select representative writing strokes of the represented ideographic character. The positions of the provided select representative writing strokes, as represented by the input signals, are compared with the identified positions of the writing strokes of the ideographic characters of the bit maps in the library of bit maps. At least one bit map is selected from the library of bit maps for an ideographic character having the same position of select representative writing strokes as the position of writing strokes corresponding to the input signals. At least one output signal is provided wherein each output signal corresponds to a selected bit map with one of the output signals having a bit map representative of the selected input ideographic character.

In addition to the foregoing method of encodingdecoding of first and last stroke entry by kind and position it is of importance to note that the described invention can be carried through several additional search means within the natural eye hierarchy of search in a corresponding programmed hierarchy.

For example, the eye in delivering data to the brain for recognition, with its superb economy of function, delivers the most obvious (easiest retrieved) data, then the next obvious, etc. until either the brain recognition function signals "hit," i.e. "recognized" or "not recognized", or denotes "information required."

As this applies to the recognition of Chinese (and other ideographic written languages), the eye first sweeps and scans for the most easily and readily identifiable unique characteristics of the target character. In the language of eye physiology and function, this sweep is termed a "saccade" and is an involuntary eye movement.

If the first scanned constituent configurations uniquely identify the targeted character, the search is complete in recognition and in the apparatus described the full character is evoked and available. If, however, the most obvious and readily accessible clues e.g. the first and last stroke position and kind as described herein, result in a non-unique identification, the eye instantly continues the search in its systematic search hierarchy, with as many sequential searches as are necessary to effect unique identification.

An embodiment of the present invention embraces these hierarchical search steps so as to eliminate non-unique identification. For example, after insertion/-providing the two select representative stroke, kind-position data, the computer may be programmed to signal non-unique identification. In one version described, the operator then follows a systematic sequential search method by inputting a third select representative stroke. Should this third stroke, kind-position data, not effect unique identification, the operator then continues to follow the above search method by inputting a fourth select representative stroke, and then additional select representative strokes until unique identification is achieved.

In a second version of the present invention, after providing the two select representative stroke, kind-position data, the computer may be programmed to signal nonunique identification. In this second embodiment, all characters identified by the first search constituent configuration are evoked and the operator makes a unique selection therefrom.

Where a character begins and/or ends with a radical, and unique identification is not effected by inputting first and last stroke, kind-position, the operator can input the first stroke following the radical. If the radical is the initial radical or the stroke immediately before the first stroke of the concluding radical, or when in the instance of a radical such as koo which encloses other strokes, the last stroke before the radical is enclosed.

Several alternative searches may be utilized and programmed. As an example, a character containing a complex radical on the left side of its basis nine square—may be readily identified by using the last (kind-position) stroke of the radical with the last kind-position stroke of the character, or by the first (kind-position) stroke following the radical if the radical be initial.

It cannot be overemphasized that the concept, means and methods utilize the traditional knowledge, skills, experience and aptitude of the Chinese (Japanese, etc.) for their own language and that the stroke input order follows that which is learned, usual and customary for the operator in handwritten usage and which has existed since "the memory of man runneth not to the contrary."

The method and apparatus disclosed here can readily be designed, as all familiar with computer technology will understand, to embody the sequential or hierachial search system described, enabling the unique identification of every character within the character library in the most economic manner.

Somewhat more computer search sophistication is required when the full search hierarchy is used as distinguished from the device described. Additionally, the operation of a full-search scenario would require a longer learning period for the user, though it should be pointed out that the search system is based upon knowledge, skill, experience and intuition the operator already possesses and requires only a special emphasis on certain limited aspects of this knowledge, the operator's.

The invention disclosed here, as those skilled in computer art and technology can readily see and understand, further permits the rapid and easy direct dictionary translation of the ideographic language into any other language, or into several other languages simultaneously. This translation can be evoked in printed, auditory, visual or computer data form or in any combination thereof. In the Chinese to Chinese example, auditory response may be of great value in bridging the dialect gap that separates hundreds of millions of Chinese from the Mandarin speaking main body.

Additionally, the concept is unique and useful in the teaching of beginning Chinese students. Using an input device of the kind described, the method and apparatus is capable of responding in pedagogical form, e.g., auditory and visual instruction, guidance and example, step by step procedures, review, testing, etc. Student progress can be monitored by disk or tape—showing the course of student response, learning, error rate and achievement.

The resulting apparatus and method has the distinct advantage of utilizing the traditionally acquired and intuitive knowledge of the Chinese written language. The present invention permits use of the full precision in which the literate Chinese have been schooled and trained, to provide ready and rapid access to a complete ideographic character set.

A further distinct advantage of the apparatus and method of the present invention is that no foreign language need be acquired; no strange parochial phonetic system need be learned; the full language power, scope, beauty and effectiveness is not comprised; and furthermore, no tortured language simplification is dictated by the system. The apparatus of the present invention uses a unique method of input of the Chinese ideographic character set that optimizes the already acquired skills and knowledge of the operator. The advantages of the system is realized in that training time is shorter and training is easier than in a sequential, linear language system.

Yet another advantage of the present invention is that it is readily adaptable to other language using ideographic characters such as Japanese and Korean.

BRIEF DESCRIPTION OF THE DRAWINGS

These and other features, objects, and advantages of the present invention will be more fully apparent from the detailed description set forth below taken in conjunction with the drawings in which like reference characters identify correspondingly throughout and wherein:

FIG. 4 illustrates in FIGS. 4a and 4b a pair of different Chinese ideographic characters having the same starting and ending positions of first and last writing strokss;

DETAILED DESCRIPTION OF THE PREFERRED EMBODIMENTS

The preferred embodiments of the invention are described in terms of an apparatus and method adapted for processing ideographic characters and specifically those of the Chinese language. It will be further understood that the invention is equally applicable to other languages represented by ideographic characters and which include, for example, the Japanese and Korean languages.

Figure 1:
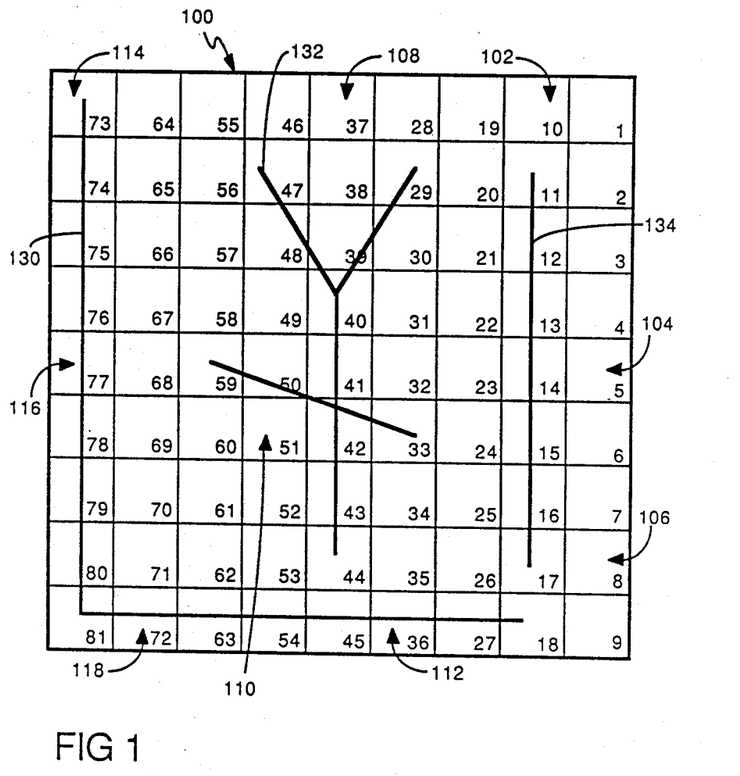
FIG. 1 illustrates in diagrammatic form a Chinese ideographic character positioned within a Chinese training square.

The classic Chinese training square (nine square) is illustrated in FIG. 1 and is identified by the reference numeral 100. Chinese training square 100 is divided by a grid pattern into nine equally sized subsquares 102-118. Each of the subsquares 102-118 defines a portion of the geometry of square 100 for the writin9 of ideographic characters. For purposes of illustration and as an important aspect of the present invention, each of the nine subsquares is further divided by a grid pattern into nine equally sized sub-subsquares or positional squares. The positional squares are identified by the reference numerals 1-81. The numbering of the 81 positional squares can be in any manner, but for the purposes of explanation positional squares 1-81 are numbered beginning with positional square 1 located in the upper right hand corner of subsquare 102. The next positional squares are numbered consecutively down through the column through subsquare 104 until it reaches the bottom right hand corner of subsquare 106 at positional square 9. The numbering of positional squares continues in the next column adjacently to the left of the just numbered column. For example, positional square 10 is located at the upper central portion of subsquare 102 with the numbering continuing down through the column and ending in subsquare 106 at the positional square 18 located as the lower central positional square in subsquare 106. The remaining numbers of positional squares continues in consecutive numbers from top to bottom of the column of positional squares and from right to left.

The Chinese training square may be thought of as a positional map for use in the positioning of writing strokes which define constituent configurations or characteristics of an ideographic character.

Most Chinese ideographic characters are typically initiated with the first writing stroke starting in one of subsquares 108, 114 or 116; and have a last writing stroke starting in one of subsquares 102, 104, 106 or 112. Therefore, a majority of the Chinese ideographic characters may be identified purely by the positional relationship of the first and last strokes.

In FIG. 1, an exemplary Chinese ideographic character is illustrated which includes a first stroke 130, a series of subsequent strokes 132 and a final stroke 134. The positional arrangement of strokes 130, 132 and 134 are unique to the word and as taught have a unique positional relationship within the training square. The character illustrated in FIG. 1 is the Chinese ideograph for the word "bear." This character can be identified by defining the positional squares in which the first and last strokes, strokes 130 and 134, each begin and end. For example, first stroke 130 begins in positional square 73 and ends in positional square 18. Similarly, last stroke 134 begins in positional square 11 and ends in positional square 17. The character illustrated in FIG. 1 is an exemplary character of all characters in the Chinese language which each have strokes that have a specific positional arrangement within the Chinese training square.

Figure 2:
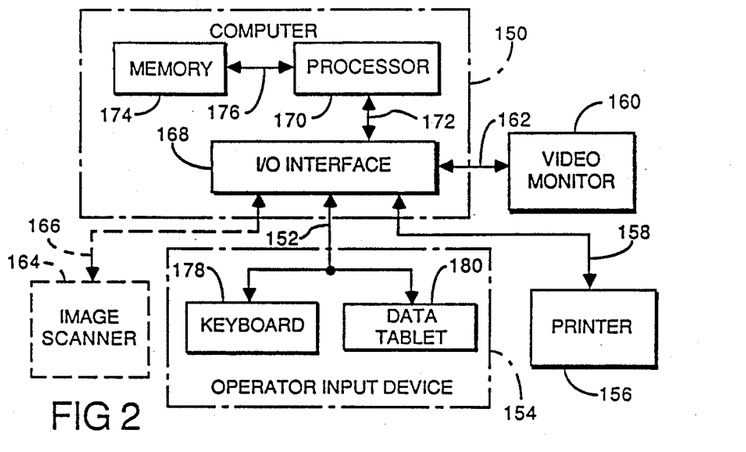
FIG. 2 is a schematical block diagram of an exemplary system configuration of the word processor of the present invention.

Using the principles of specific positional arrangement of the strokes of a character within the Chinese training square, a computerized word processing system is implemented. FIG. 2 illustrates one such implementation of a computerized Chinese word processor. In FIG. 2, computer 150 is coupled by line 152 to an operator input device 154. Operator input device may be a keyboard, data tablet, mouse used individually or in combination. Further coupled to computer 150 are visual display means such as printer 156, coupled by line 158 to computer 150, and video monitor 160 coupled by line 162 to computer 150. The system may also comprise an optional image scanner 164 coupled to computer 150 by line 166. Furthermore, the system may include a data storage device or auditory signal device (not shown) coupled to computer 150.

Computer 150 includes the basic computer elements of I/O interface 168, processor 170 and memory 174. I/O interface 168 interfaces computer 150 with the computer peripheral devices such as operator input device 154, printer 156, video monitor 160 and image scanner 164 respectively via lines 152, 158, 162 and 166. I/O interface 168 acts as a buffer between signals provided from the peripheral devices into processor 170. Processor 170 is coupled to I/O interface 168 by line 172 while memory 174 is coupled to processor 170 by line 176.

Operator input device 154 is typically comprised of a keyboard 178 and data tablet 180 with data tablet 180 also known a a digitizer pad. Both keyboard 178 and data tablet 180 are coupled by line 152 to the I/O interface 168. In an alternate embodiment of the invention data tablet 180 and keyboard 178 may be combined in a single input device with the functions associated with a keyboard incorporated into a portion of the data tablet.

Keyboard 178 is used to input general commands to computer 150. Data tablet 180 is used to input to computer 150 positions of operator handwritten Chinese ideographs. The input signals generated by data tablet 180 in response to the operator input are provided to processor 170 through I/O interface 168. Stored within memory 174 are the instructional programs for processor control and a set of character representations. The character representations, such as bit maps, are digital representations corresponding to the entire ideographic characters, and are indexed according to the stroke identifying features associated with the respective character. Processor 170 receives the signals from I/O interface 168 and interprets the signals as stroke identifying features of an operator selected character. Processor 170 compares the interpreted signals with the indexed stroke identifying features to select a character representation having stroke identifying features that correlate with those of the interpreted input singals. Upon selection of a character representation, the selected character representation is output to either video monitor 160 and/or printer 156.

In development of the system, image scanner 164 is used to scan printed Chinese characters and digitize each character as a 120×120 dot bit map. The bit map for each character is stored in memory 174. Each bit map is associated with a stroke sequence by inputting the corresponding character writing strokes via the data tablet. It is readily understood by one skilled in the art that the bit map may be replaced with other forms of character representations such as instructions and data for use in a graphics mode by the computer or a peripheral device.

The processor indexes each bit map according to the starting and ending positions of the first and last strokes. For example, the character illustrated in FIG. 1 has a first stroke 130 which respectively begins and ends in positional squares 73 and 18. Similarly, the last stroke 134 respectively begins and ends in positional squares 11 and 17. The positional squares in which the first and last strokes begin and end are used to identify the bit map corresponding to the input character. The positional square numbers are used to generate an eight byte key that is assigned to the bit map. For the character of FIG. 1, the sequence of first stroke beginning and ending positional square numers followed by the last stroke positional beginning and ending square numbers results in the following positional square number sequence "73," "18," "11" and "17." In generating the indexing byte key, each digit of the positional square sequence is converted into a byte according to the digit's ASCII representation. In the above example the eight byte sequence would be as follows: "7," "3," "1," "8," "1," "1," "1" and "7" with each digit of a corresponding ASCII representation. Correspondingly should a writing stroke starting or ending position fall within a single digit identified positional square, the system interprets the single digit as if an additional "O" digit proceeds the single digit. It should be understood that should a character be comprised of a single writing stroke, the input is the starting and ending positions of the stroke. A special function key is used then to indicate that the character writing stroke input has ended. The corresponding character bit map is indexed according to the ASCII code generated by the single stroke. It also should be understood that in ASCII, the key may be associated with a discrete number. This number can be used as a character identifier where the character representation is stored in a peripherial device and identified by the number. This type of system results in a savings in memory size in the processor since the bit map is not stored in the processor memory.

Each character in the Chinese language is accordingly stored as a bit map within memory 174 and indexed for storage according to the operator input writing strokes input via the data tablet. All of the characters with their stroke assignments are stored as an indexed file in memory 174. Indexing is done by a binary tree method with the stroke assignment as the key for storage and access.

In operation of the system, an operator inputs or writes on data tablet 180 the selected Chinese character. Data tablet 180 provides input signals to processor 170 via I/O interface 168. Processor 170 uses these output signals corresponding to the starting and ending positions of the first and last writing strokes for accessing memory 174.

The data tablet input signals correspond to the sequence of positional squares in the first and last writing stroke beginning and ending positions. For example, the input of writing strokes corresponding to the character of FIG. 1 would again produce the eight byte ASCII key. The produced key would then be used by processor 170 in conducting a primary search by accessing one or more stored bit maps having the same ASCII byte key as its identifying feature. The bit maps of the selected characters are then provided as output signals to either or both video monitor 160 or printer 158.

Figure 3:
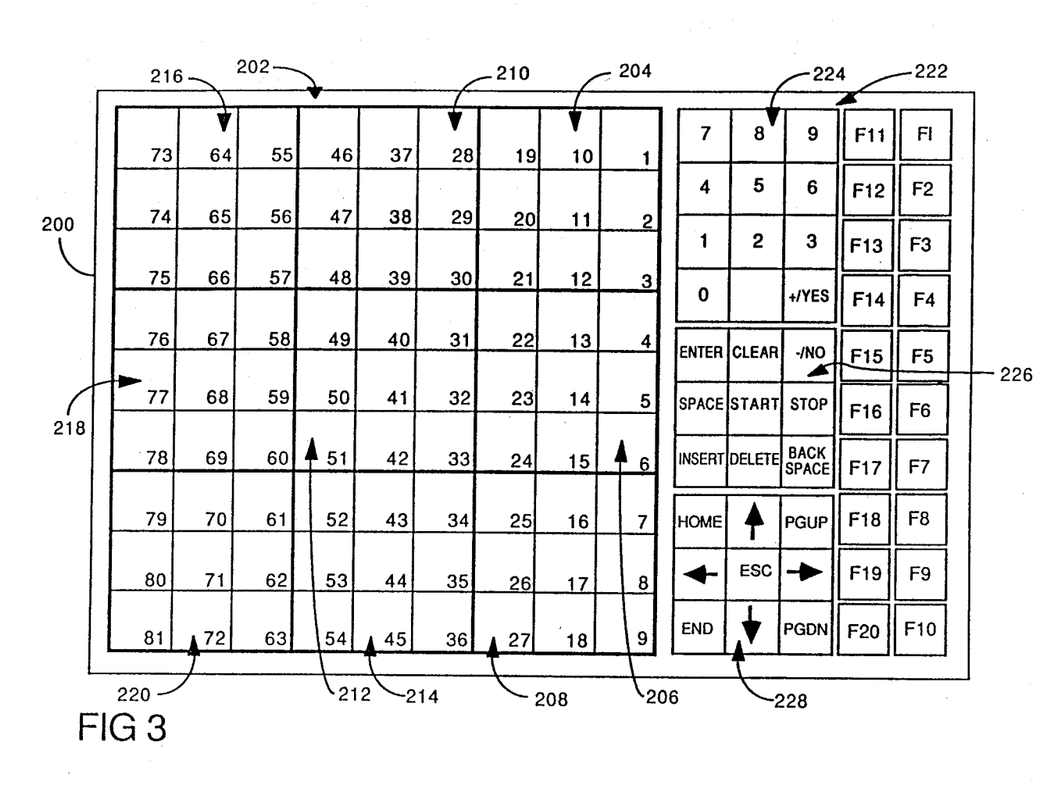
FIG. 3 is a diagrammatic view of an exemplary operator input device;.

FIG. 3 illustrates a representative digitizer pad or data tablet 200 which incorporates a pressure sensitive surface for generating a signal corresponding to the X-Y coordinate where contact is made on the surface. The pressure sensitive surface of data tablet 200 includes an overlay which defines a Chinese training square 202. Chinese training square 202 is divided by the overlay into nine subsquares 204, 206, 208, 210, 212, 214, 216, 218 and 220. Chinese training squares 202 is further divided into the eighty-one positional squares, as was described with reference to FIG. 1.

Data tablet 200 is sensitive to the contact of an operator inputting writing strokes which comprise a Chinese ideographic character. For example, the Chinese character for "bear" as illustrated in FIG. 1, is written by the operator contacting the surface of Chinese training square 202 with writing strokes that one would write the character with a pen on paper. Data tablet 200, being sensitive to the operator writing strokes, provide X-Y coordinate output signals corresponding to the positional squares in which contacts is made on the data tablet surface. In this arrangement, a stream of positional data is input to the computer in accordance with the X-Y coordinates in the tracing of each writing stroke. The processor interprets, under software control, the X-Y coordinate of the output signal and assigns the corresponding positional square number thereto. The selected positional square numbers are then used by the processor to access the bit maps indexed according to the positional square numbers. Using conventional software techniques only the coordinate data relating to the first and last writing strokes starting and ending positional squares are saved for processing.

In another embodiment of the invention, the operator need only contact four positional squares in a sequence corresponding to the following sequence: first stroke starting position; first stroke ending position; last stroke starting position; and last stroke ending position. Therefore, a complete tracing of the character is not required to select a character.

The computer uses the starting and ending positions of the first and last writing strokes of each character as input by the operator for character memory accessing. The signals generated by the data tablet are dependent upon the positions of the strokes and the resolution of the data tablet in stroke detection. For a high resolution data tablet the computer senses an input signal corresponding to each detection point within each positional square contact made. For a low resolution data tablet, the contact within positional square may provide a single output signal to the computer. With either a high or low resolution data tablet only one X-Y coordinate data in the data tablet input signal identifies the positional square in which contact is made.

In FIG. 3, data tablet 200 also includes an overlay which defines region 222 of individual functional keys. Included in region 222 as the functional keys are special function keys F1–F20, numerical keys 224, character processing keys 226, and cursor control keys 228. Contacting of data tablet 200 within region 222 that defines one of the funcional keys, for example special function key F1, results in a signal being generated corresponding to the X-Y coordinate of contact. This signal is output to the computer where signal X-Y coordinates are recognized as an operator request for a predetermined special function in the processing. For example, when several characters are displayed which have the same stroke characteristics, the cursor control key and the YES key may be used to select one of the particular characters. In an alternate embodiment the functional keys are provided on a conventional keyboard with the data tablet or a mouse used for the input of writing strokes.

Figure 4A:
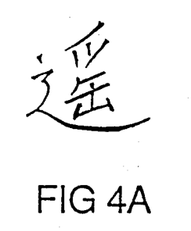
Figure 4B:
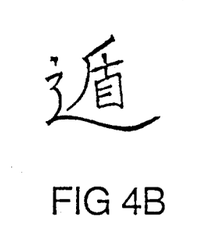
Figure 5:
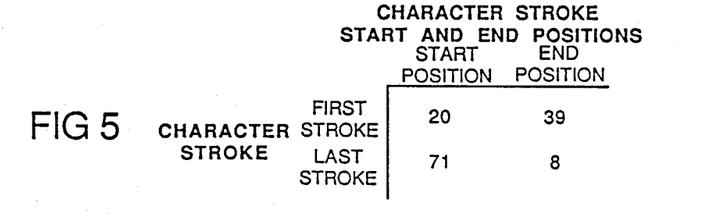
FIG. 5 is a table illustrating the character writing stroke start and end positions for the first and last writing strokes of the characters of FIG. 4.

Since the Chinese language and other ideographic character languages are typically rather large, the starting and ending positions of different character's first and last strokes may fall within corresponding positional squares. For example, the character illustrated in FIGS. 4A and 4B illustrate two distinct characters which have the same stroke sequence, i.e. first stroke start and end positions followed by last stroke start and end positions. FIG. 5 is a table indicating the identical character stroke start and end positions for both the first and last strokes of both characters. As can be seen in FIG. 5, the stroke sequence of both characters is such that the first stroke starts at positional square 20 and ends at positional square 39 while the last stroke starts at positional square 71 and ends at positional square 8.

In the operation of the system of the presently described embodiment of the present invention, an operator providing the select representative writing strokes corresponding to the character illustrated in FIG. 4A would result in the accessing within the computer memory, the bit maps for the characters illustrated in both FIGS. 4A and 4B. The computer would alert the operator to this multiple character accessing by an operator annunciator or a visual indication. The operator is then (or at the end of the line, page or document) required to select the appropriate character from the set of accessed characters using the functional keys. The characters of the individual multiple character selection may be presented in several different formats. One such format is the presentation of a group of characters with the operator progressing through the characters indicating an affirmative character selection through the YES function key, for the appropriate character, or a negative character selection through the NO function key.

In the alternative, the system may require the input of an additional select representative writing stroke to distinguish a character from a plurality of characters. In this form, the characters are also indexed by the additional writing stroke in a manner similar to that described with reference to the primary search. If this secondary search reveals more than one unique character, the operator may select a unique character from the group as earlier described. In the alternative an additional or tertiary search identifier features may be implemented in a manner as described with reference to the primary search.

The data tablet, alone or with a conventional keyboard, may also be used to insert Roman characters in Chinese text. In a combination Roman-Chinese word processor for the oriental use there is no need for the user to learn a foreign language. A word processor using only the data tablet may be realized by merely shifting the device into a non-Chinese mode and tracing the required Roman letters.

Figure 6:
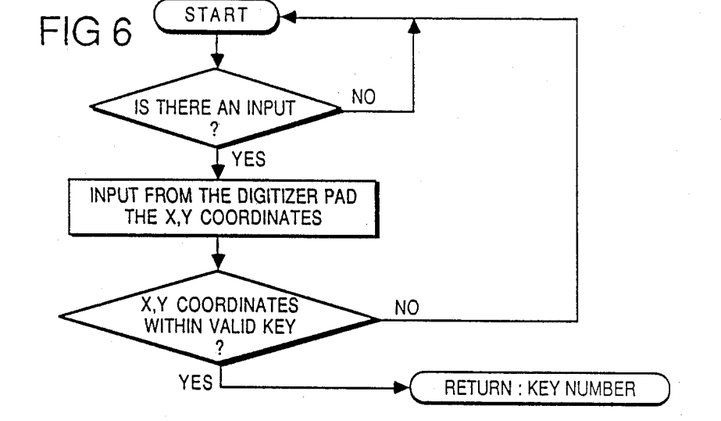
FIG. 6 is a flow chart illustrating the processing of each operator input stroke as a key input.

FIG. 6 illustrates a flow chart corresponding to the use of a data tablet for the input from an operator.

This program permits the computer to simulate the touching of defined keys as opposed to the random X-Y coordinates provided by the digitizer. This program is used each time by the computer and operator provides an input touch to the data tablet. The digitizer pad provides an output signal to the computer of X-Y coordinates corresponding to the operator contact of the digitizer pad. The program uses these X-Y coordinates to determine whether or not the coordinates are within a predefined region of X-Y coordinates that define a key on the digitizer pad. The processor interprets the X-Y coordinates as being either a valid or invalid key and generates a corresponding key number if they are valid key coordinates.

Figure 7:
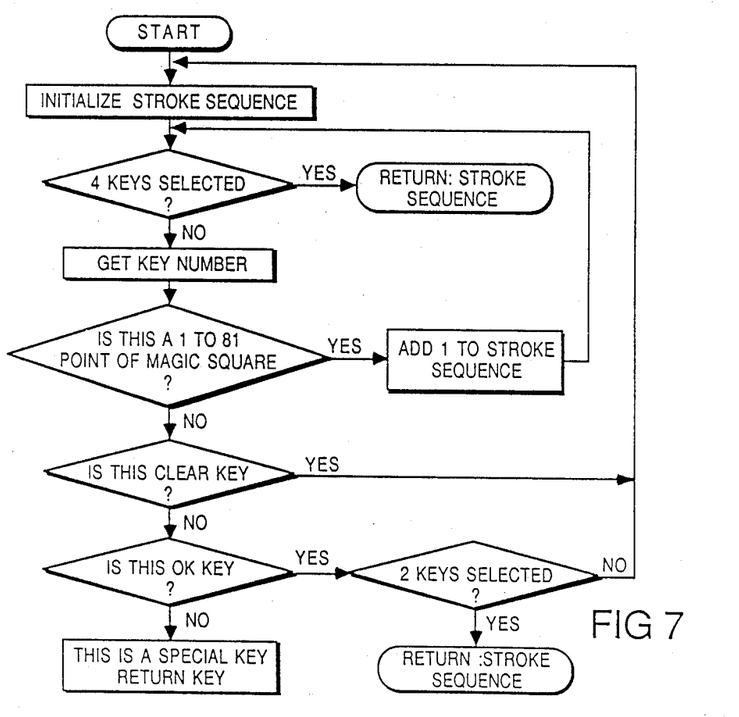
FIG. 7 is a flow chart illustrating the processing of the key inputs.

FIG. 7 illustrates the flow chart illustrating the processing of the key inputs. This portion of the program is used for entering the strokes into the system. Building on the "key" concept as described with reference to FIG. 6, a meaning is assigned to each of the certain keys. Eighty-one of the keys are assigned to the Chinese training square while the remaining keys are assigned other functions. In one embodiment of the invention, a minimum of two keys are needed to define a stroke. For example, these two keys would be the starting and ending positions of the stroke. In many cases four keys respectively corresponding to the first stroke starting and ending positions and last stroke starting and ending positions are used to form a character stroke sequence. However, in certain cases where a character is comprised of a single stroke, only two keys need be selected which correspond to the stroke starting and ending positions. These two keys would then define the stroke sequence.

Figure 8:
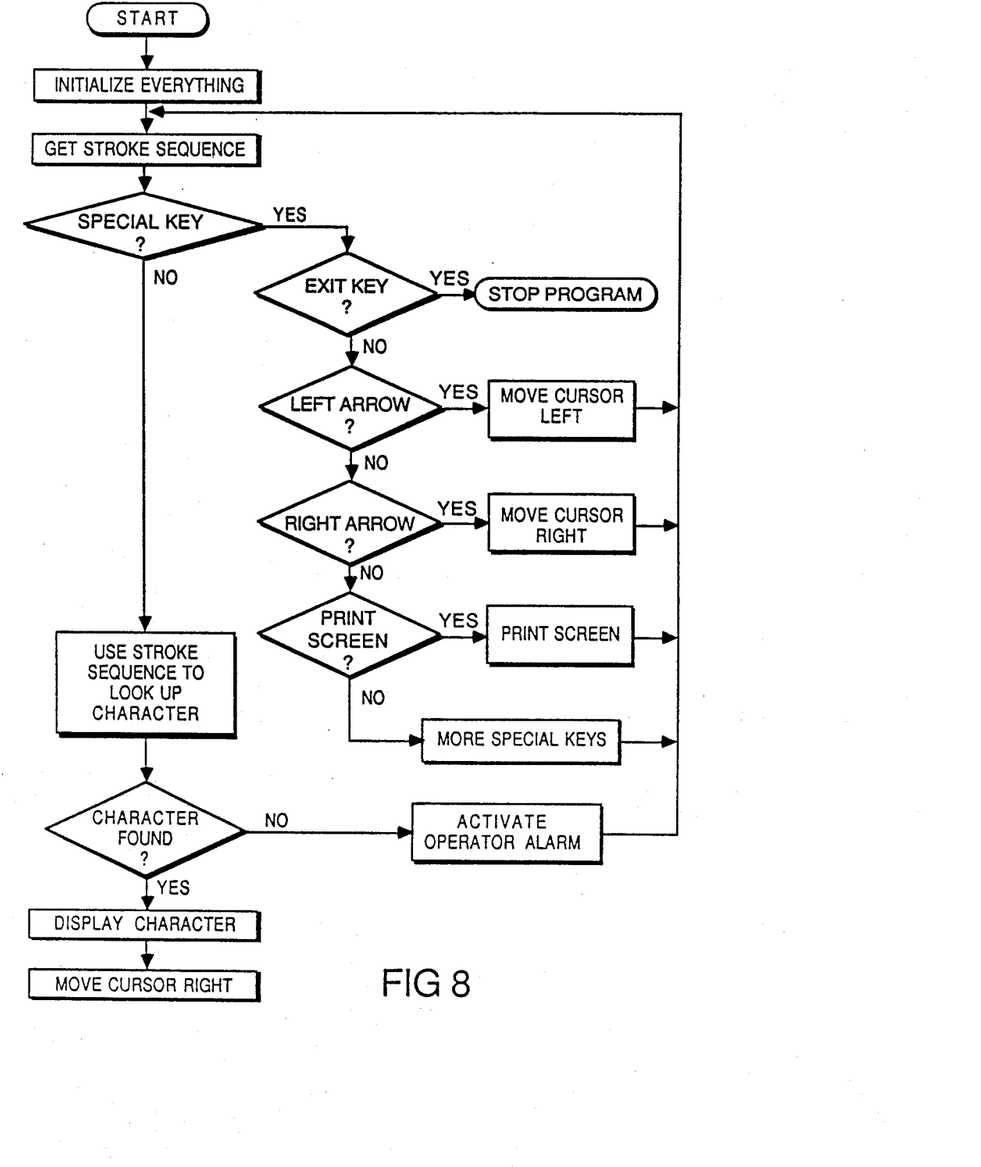
FIG. 8 is a flow chart illustrating the operation of the character processing.

FIG. 8 is a flow chart for a simple character processor. This portion of the program builds upon the programs as described with reference to FIGS. 6 and 7. In FIG. 8, upon initialization the stroke sequence is used to look up the bit map of the character and when the character is found it is displayed. If the input is a special key the program performs the special key function.

Figure 9:
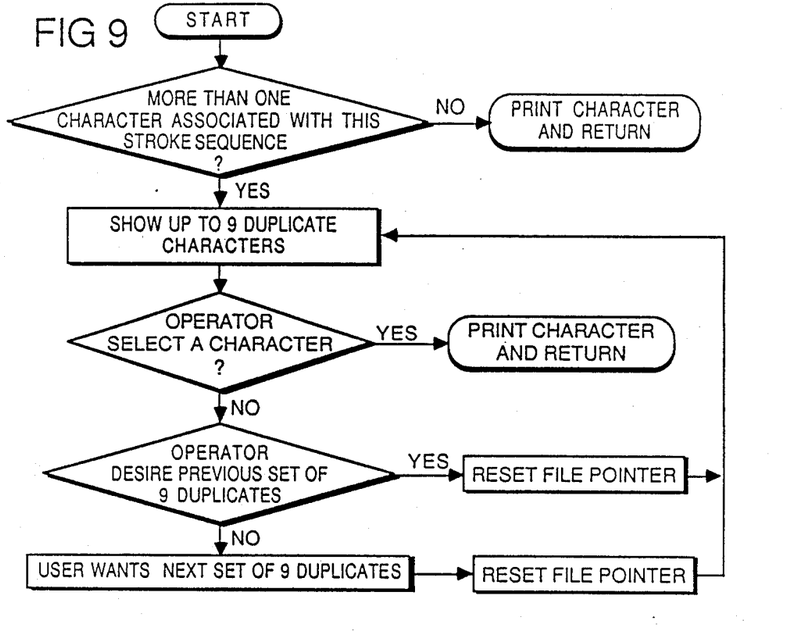
FIG. 9 is a flow chart illustrating the selection and display of multiple characters having the same stroke sequence.

FIG. 9 illustrates a flow chart for the program that corresponds to the display of the character if there is more than one character having the same input identifying stroke sequence. This portion of the program is a subset of the "display character" block of FIG. 8. In the event that there are duplicate characters, the system will display up to nine duplicate characters. The operator is then permitted to select a character and if the operator does not, the operator may move on to the next set of nine duplicates or back to a previous set of nine duplicates. This embodiment is to be clearly distinguished from the hierarchical search to unique identification herein described.

Figure 10:
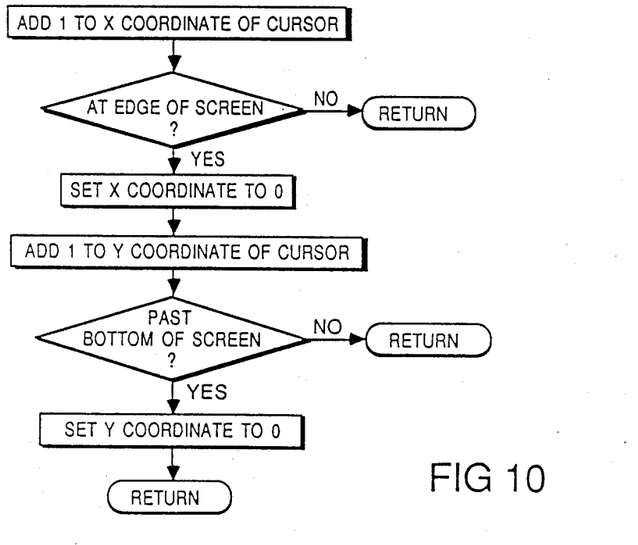
FIG. 10 is a flow chart illustrating cursor control.

FIG. 10 illustrates a flow chart of the program of cursor control when the cursor is moved one position horizontally across the page. If the cursor is at the edge of the screen it is returned to the opposite side of the screen and down one position on the screen. If the cursor moves when in the last or bottom line of the screen it is moved in the next position to the first or uppermost horizontal line with the cursor set at the first position or leftmost position in the line.

As described herein, the presently described embodiment of the invention has been described with reference to the X-Y coordinates of the starting and ending positions of the first and last strokes of the character. Using this search strategy, a large majority of Chinese characters may be uniquely identified. Where multiple characters are accessed by the same first and last input format, an additional format is to have those characters placed in a numbered array from which the operator selects a desired character by indicating the corresponding number. This scenario is probably more efficient and does result in uniquely identifying every Chinese character with no more than three inputs. It should be understood that in another search scenario, a predetermined additional writing stroke may be used for this third identifier without reference to the above described numbered array or to a menu.

Furthermore, the present invention envisions use of different search scenarios. Besides utilizing the first/last stroke, other strokes may be used. For example, the search may include the first and penultimate stroke; or second stroke and last stroke; or second stroke and penultimate stroke; or any combination of the first, second, penultimate or last stroke.

Moreover, when a character begins with a radical, the following search strategy may be used. For example, the search may use the initial stroke of the character and radical and the last stroke of the character; the last stroke of the initial radical and the last stroke of the character; or the last stroke of the initial radical and the penultimate stroke of the character. Furthermore, in instances where the character ends in a radical, a successful search scenario will employ the following constituent stroke configuration. For example, this would include the first stroke of the character and first stroke of the ending radical; or first stroke of the character or first stroke before the beginning of the ending radical. In those instances where the character commences in a radical and ends in a radical, the following search strategy may be used: first stroke of initial radical and first stroke of ending radical; or last stroke of initial radical and first stroke of ending radical; or last stroke of initial radical and the last stroke before the beginning stroke of ending radical; or last stroke of initial radical and the last stroke before the beginning stroke of the ending radical; or first stroke after the last stroke of the initial radical and last stroke of the character. Similarly, the various search scenarios may use the search strokes in reverse order. It should be understood that the foregoing outline, while complex to the linear Roman language reader, involves only well known and frequently used stroke formats and is no more recondite than the alphabet and spelling to the Roman language user.

Figure 11:
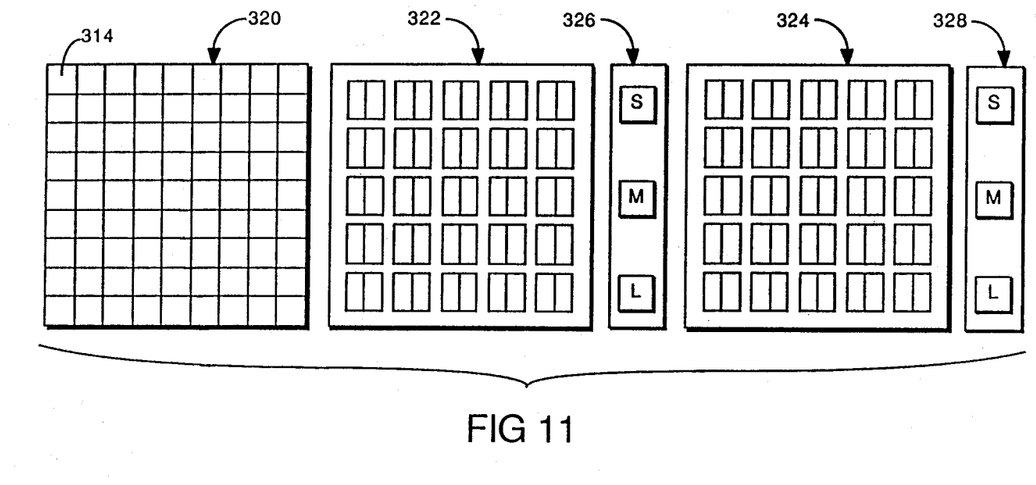
FIG. 11 is an alternative keyboard.
Figure 12:
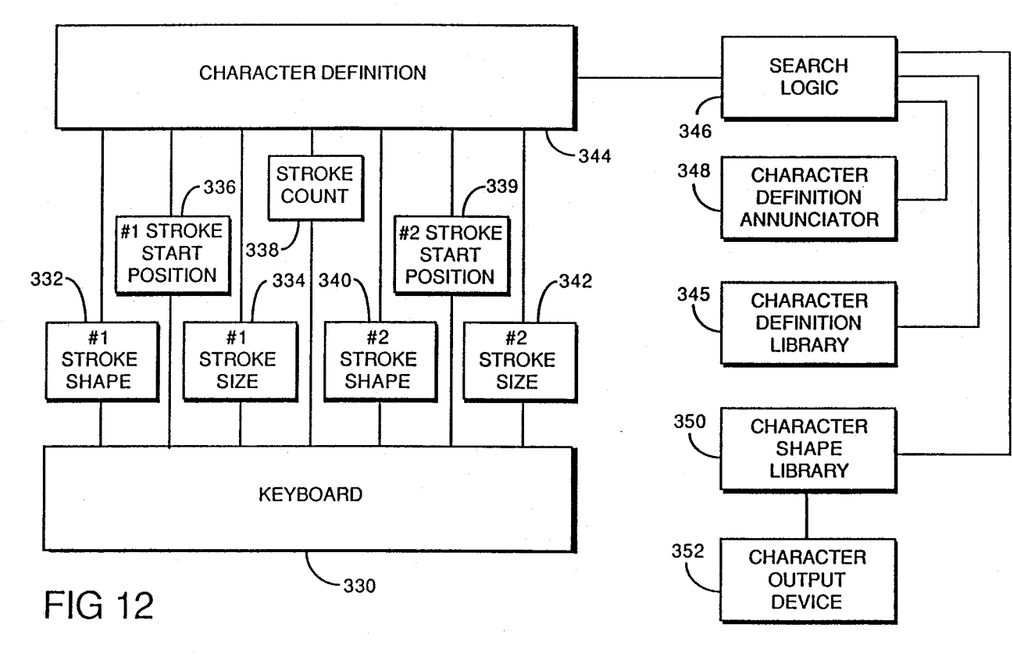
FIG. 12 is a functional block diagram of an alternative embodiment of the invention.

An alternative embodiment of the invention is illustrated in FIGS. 11 and 12. With reference to FIG. 1, the character therein can be uniquely identified by defining the stroke 130 as stroke number one starting in positional square 73, and stroke number one comprising a stroke of an identified type and size (a large right angle); and a final stroke 134, i.e. stroke number two which is identified as being a vertical stroke of medium size; and lastly by entering the stroke count of six. By entering information corresponding to these criteria, the character is singularly defined and uniquely identified and then evoked from the entire Chinese character set.

FIG. 11 illustrates a keyboard which is exemplary of a keyboard which may be utilized to input the data referred to in FIG. 1. The first input element 320 is utilized to indicate the precise start position for the stroke, i.e., positional square 73. Two stroke-type keyboards 322 and 324 are provided with each keyboard accommodating the forty-four character types with paired keys for left and right hand variations on the characters, a keyboard matrix of five by five characters can define all forty-four characters with a single keystroke. A complete eighty-nine character set is then defined by selecting from the character size keyboard immediately adjacent to the character type keyboard, keyboard 326 being associated with keyboard 322, and the keyboard 328 being associated with the keyboard 324. By an appropriate arrangement of the several keyboards, and utilizing one finger for start stroke position, one or two fingers for character type, and one finger for size; then with a single stroke of both wrists, a complete Chinese character can be defined (a single stroke is executed in the manner of a stenotype operator by depressing several keys simultaneously).

Referring to FIG. 12, the basic functional operation of a system utilizing the present method is illustrated. The keyboard in FIG. 11 is illustrated diagrammatically as keyboard 330. A series of registers store the keyed information until a complete stroke is executed, and include register 332 for number one stroke shape, 334 for stroke number one stroke size, 336 for number one start position, 338 for stroke count, 340 for stroke number two strokeshape, 342 for stroke number two stroke size, and 339 for stroke number two stroke start position. When each register has the information entered into it, the information is drawn into the character definition register 344, and inputted in the search logic 346. Search logic refers to a character definition library 345 where the stroke count, first and last stroke start position, and first and last stroke shape and size are indexed together with a number identifying each unique character in the more than 35,000 character set. As soon as the search logic 346 determines that character definition library 345 contains a number which uniquely identifies a particular one of the 35,000 characters, then a signal is output to the character definition annunciator 348 which indicates to the operator that a character has been successfully defined. Where additional strokes are necessary to define the character, then the keys may be struck in the same manner, either immediately or by returning to the character subsequently.

At the same time that the character annunciator is activated, search logic 346 outputs the number corresponding to the identified character to character shape library 350. Character shape library 350 contains the complete character definition including all the strokes (not just the first and last strokes) for each of the 35,000 characters. The defined character specifics are then output to a character output device 352 which may be a printer, display screen, or similar device for displaying the complete character. The character output device may be utilized during word processing as confirmation that the desired character has been selected, and is utilized during printing to faithfully reproduce each detail of a complete character.

Those knowledgeable in the art will readily perceive the application of the described apparatus and method to computers and teaching machines. It is understood that the system of the present invention is described with reference to the full Chinese character set, it is equally applicable to the approximately 11,000 characters in the simplified character set. Learning written Chinese, even for those native to the culture, would be immeasurably lightened and broadened using the present invention. Furthermore, the present invention realizes a substantial reduction in instruction and application time via instant access to dictionary information in a visually displayed form.

The previous description of the preferred embodiments are provided to enable any person skilled in the art to make or use the present invention. Various modifications to these embodiments will be readily apparent to those skilled in the art, and the generic principles defined herein may be provided to other embodiments without the use of the inventive faculty. Thus, the present invention is not intended to be limited to the embodiment shown herein, but is to be accorded the widest scope consistent with the principles and novel features disclosed herein.

What is claimed is:

1. A method for identifying a selected ideographic character in a set of ideographic characters, the method comprising providing a library of character representations,
    each character representation in said library of character representations representing a respective ideographic character in said set of ideographic characters,
    each said character representation comprising a plurality of predetermined constituent characteristics of said respective ideographic character represented by said character representation,
    said plurality of predetermined constituent characteristics of said respective character comprising for each of a plurality of predetermined character strokes of said respective ideographic character a plurality of stroke characteristics, and providing a plurality of input signals for each of a plurality of input character strokes,
    said input signals corresponding to at least two of the stroke characteristics of the character stroke of said selected ideographic character corresponding to each of said predetermined character strokes,
    said plurality of input character strokes comprising, for ideographic characters comprising more than three character strokes, fewer than the total number of character strokes of said ideographic character, and identifying in said library said selected ideographic character based on said plurality of input signals.

2. The method of claim 1 wherein said plurality of input character strokes comprises the first character stroke of said selected ideographic character.

3. The method of claim 1 wherein said plurality of input character strokes comprises the last character stroke of said selected ideographic character.

4. The method of claim 1 wherein said plurality of input character strokes comprises the first character stroke and the last character stroke of said selected ideographic character.

5. The method of claim 1 wherein said plurality of input character strokes comprises the second character stroke of said selected ideographic character.

6. The method of claim 1 wherein said plurality of input character strokes comprises the penultimate character stroke of said selected ideographic character.

7. The method of claim 1 wherein said plurality of input character strokes comprises the first character stroke following an initial radical of said selected ideographic character.

8. The method of claim 1 wherein said plurality of input character strokes comprises the last character stroke before a non-initial radical of said selected ideographic character.

9. The method of claim 1 wherein said plurality of input character strokes comprises the last character stroke of an initial radical of said selected ideographic character.

10. The method of claim 1 wherein said plurality of input character strokes comprises the first character stroke of a non-initial radical of said selected ideographic character.

11. The method of claim 1 wherein said plurality of stroke characteristics for said each of said plurality of predetermined character strokes comprises the location within said ideographic character of said predetermined character stroke.

12. The method of claim 11 wherein said location within said ideographic character is determined with reference to a positional map.

13. The method of claim 12 wherein said positional map corresponds to a teaching square comprising nine subsquares.

14. The method of claim 12 wherein said positional map corresponds to a teaching square comprising nine subsquares, each of said subsquares comprising nine sub-subsquares.

15. Th method of claim 11 wherein said location within said ideographic character is determined with reference to a teaching square comprising nine sub-squares, each of said subsquares comprising nine sub-subsquares.

16. The method of claim 11 wherein said plurality of stroke characteristics for each of said plurality of predetermined character strokes further comprises a shape characteristic of said predetermined character strokes.

17. The method of claim 1 wherein said plurality of stroke characteristics for said each of said plurality of predetermined character strokes comprises the location within said ideographic character of the beginning point of said predetermined character stroke.

18. The method of claim 1 wherein said plurality of stroke characteristics for said each of said plurality of predetermined character strokes comprises the location within said ideographic character of the ending point of said predetermined character stroke.

19. The method of claim 1 wherein said plurality of stroke characteristics for said each of said plurality of predetermined character strokes comprises the location within said ideographic character of the beginning point and the ending point of said predetermined character stroke.

20. The method of claim 1 wherein said plurality of stroke characteristics for said each of said plurality of predetermined character strokes comprises a shape characteristic of said predetermined character stroke.

21. The method of claim 1 wherein said set of ideographic characters comprises ideographic characters of the Chinese language.

22. The method of claim 1 wherein said set of ideographic characters comprises ideographic characters of the Japanese language.

23. The method of claim 1 wherein said set of ideographic characters comprises ideographic characters of the Korean language.

24. Apparatus for identifying a selected ideographic character in a set of ideographic characters, said apparatus comprising apparatus adapted for storing a library of character representations,     each character representation in said library of character representations representing a respective ideographic character in said set of ideographic characters.

each said character representation comprising a plurality of predetermined constituent characteristics of said respective ideographic character represented by said character representation.

said plurality of predetermined constituent characteristics of said respective character comprising for each of a plurality of predetermined character strokes of said respective ideographic character a plurality of stroke characteristics, apparatus adapted for providing a plurality of input signals for each of a plurality of input character strokes,     said input signals corresponding to at least two of the stroke characteristics of the character stroke of said selected ideographic character corresponding to each of said predetermined character strokes,     said plurality of input character strokes comprising, for ideographic characters comprising more than three character strokes, fewer than the total number of character strokes of said ideographic character, and apparatus adapted for identifying in said library said selected ideographic character, based on said plurality of input signals 25. The apparatus of claim 24 wherein said apparatus adapted for providing input signals is sensitive to operator input and is adapted for transducing said operator input to said input signals.

26. The apparatus of claim 24 wherein said apparatus adapted for providing input signals comprises a data tablet.

27. The apparatus of claim 26 wherein said data tablet is provided with an overlay defining a training square comprising 9 subsquares.

28. The apparatus of claim 26 wherein said data tablet is provided with an overlay defining a training square comprising 81 sub-subsquares.

29. The apparatus of claim 26 wherein said data tablet is provided with an overlay defining key positions corresponding to subsquares of a training square.

30. The apparatus of claim 26 wherein said data tablet is provided with an overlay defining key positions corresponding to sub-subsquares of a training square.

31. The apparatus of claim 26 wherein said data tablet is provided with an overlay defining a positional map.

32. The apparatus of claim 31 wherein said positional map corresponds to a training square.

33. The apparatus of claim 31 wherein said positional map corresponds to a training square comprising 9 subsquares.

34. The apparatus of claim 31 wherein said positional map corresponds to a training square comprising 81 sub-subsquarees.

35. The apparatus of claim 24 wherein said apparatus adapted for providing input signals comprises a keyboard.

36. The apparatus of claim 35 wherein said keyboard comprises a plurality of keys each corresponding to a subsquare on a training square.

37. The apparatus of claim 35 wherein said keyboard comprises a plurality of keys each corresponding to a sub-subsquare on a training square.

38. The apparatus of claim 35 wherein said keyboard comprises a plurality of keys each corresponding to a character stroke type.

39. The apparatus of claim 35 wherein said keyboard comprises a plurality of key each corresponding to a character stroke size.

40. The apparatus of claim 35 wherein said keyboard comprises a plurality of keys each corresponding to a character stroke position.

41. The apparatus of claim 24 wherein said operator input comprises a beam of electromagnetic waves.

42. The apparatus of claim 24 wherein said operator input comprises a beam of light.

43. A method for displaying a selected ideographic character, comprising
providing a library of character representations,
each character representation in said library of character representations representing a respective ideographic character in said set of ideographic characters,
each said character representation comprising a plurality of predetermined constituent characteristics of said respective ideographic character represented by said character representation.
said plurality of predetermined constituent characteristics of said respective character comprising for each of a plurality of predetermined character strokes of said respective ideographic character a plurality of stroke characteristics, and
providing a plurality of input signals for each of a plurality of input character strokes,
said input signals corresponding to at least two of the stroke characteristics of the character stroke of said selected ideographic character corresponding to each of said predeterined character strokes,
said plurality of input character strokes comprising, for ideographic characters comprising more than three character strokes, fewer than the total number of character strokes of said ideographic character,
identifying the respective ideographic character represented by a character representation in said library of character representations, said character representation having predetermined constituent characteristics of said predetermined character strokes corresponding to said input signals, and
displaying said respective ideographic character.

44. Apparatus for presenting a selected ideographic character in a set of ideographic characters, said apparatus comprising
apparatus adapted for storing a library of character representations,
each character representation in said library of character representations representing a respective ideographic character in said set of ideographic characters.
each said character representation comprising a plurality of predetermined constituent characteristics of said respective ideographic character represented by said character representation.
said plurality of predetermined constituent characteristics of said respective character comprising for each of a plurality of predetermined character strokes of said respective ideographic character a plurality of stroke characteristics,
apparatus adapted for providing a plurality of input signals for each of a plurality of input character strokes,
said input signals corresponding to at least two of the stroke characteristics of the character stroke of said selected ideographic character corresponding to each of said predetermined character strokes,
said plurality of input character strokes comprising, for ideographic characters comprising more than three character strokes, fewer than the total number of character strokes of said ideographic character,
apparatus adapted for identifying in said library said selected ideographic character based on said plurality of input signals, and
apparatus adapted for presenting said identified character.

45. The apparatus of claim 44 wherein said presenting said identified character comprises visually presenting said identified character.

46. The apparatus of claim 44 wherein said apparatus adapted for presenting said identified character comprises a printer.

47. The apparatus of claim 44 wherein said apparatus adapted for presenting said identified character comprises video display apparatus.

* * * * *

UNITED STATES PATENT AND TRADEMARK OFFICE
CERTIFICATE OF CORRECTION

PATENT NO. : 4,829,583
DATED : May 9, 1989
INVENTOR(S) : James C. Monroe; Stephen E. Roberts; Thomas A. Knoche It is certified that error appears in the above-identified patent and that said Letters Patent is hereby corrected as shown below:

Column 7, line 59, delete ",".
Column 8, line 28, "writin9" should be --writing--.
Column 10, line 26, "numers" should be --numbers--.

Column 17, line 28, "Th" should be --The--.
Column 18, line 6, after characters "." should be --,--.
Column 18, line 10, after representation "." should be --,--.
Column 19, line 8, "key" should be --keys--.
Column 20, line 12, "characters." should read -- characters, --.
Column 20, line 16, "representation." should read -- representation, --.

Signed and Sealed this

Nineteenth Day of December, 1989

Attest:

JEFFREY M. SAMUELS

Attesting Officer Acting Commissioner of Patents and Trademarks